Feb. 17, 1953
J. P. MURDOCH
2,628,621
METHOD AND APPARATUS FOR HUSKING
CORN EMPLOYING AN AIR BLAST
Filed Feb. 12, 1948
3 Sheets-Sheet 2
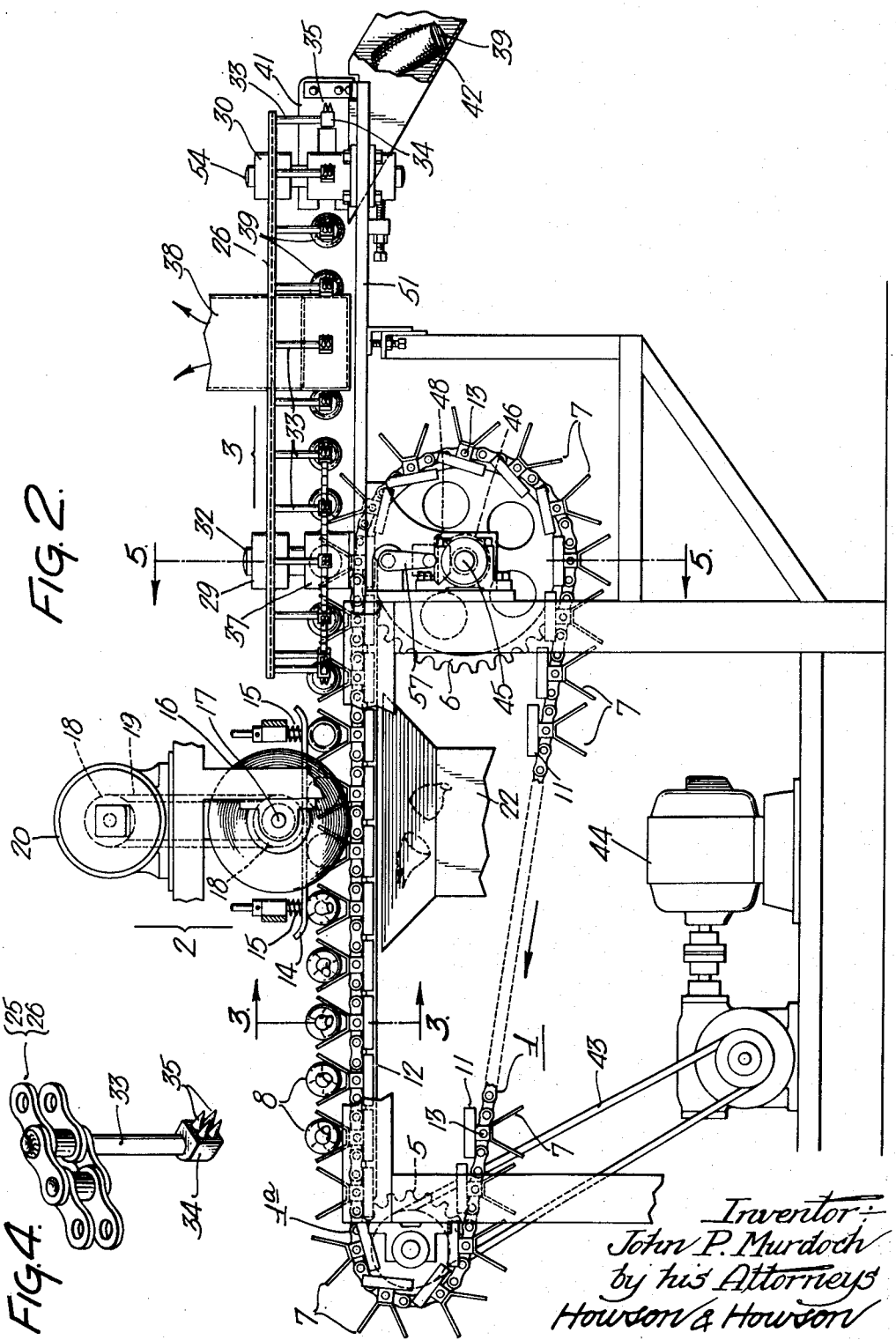

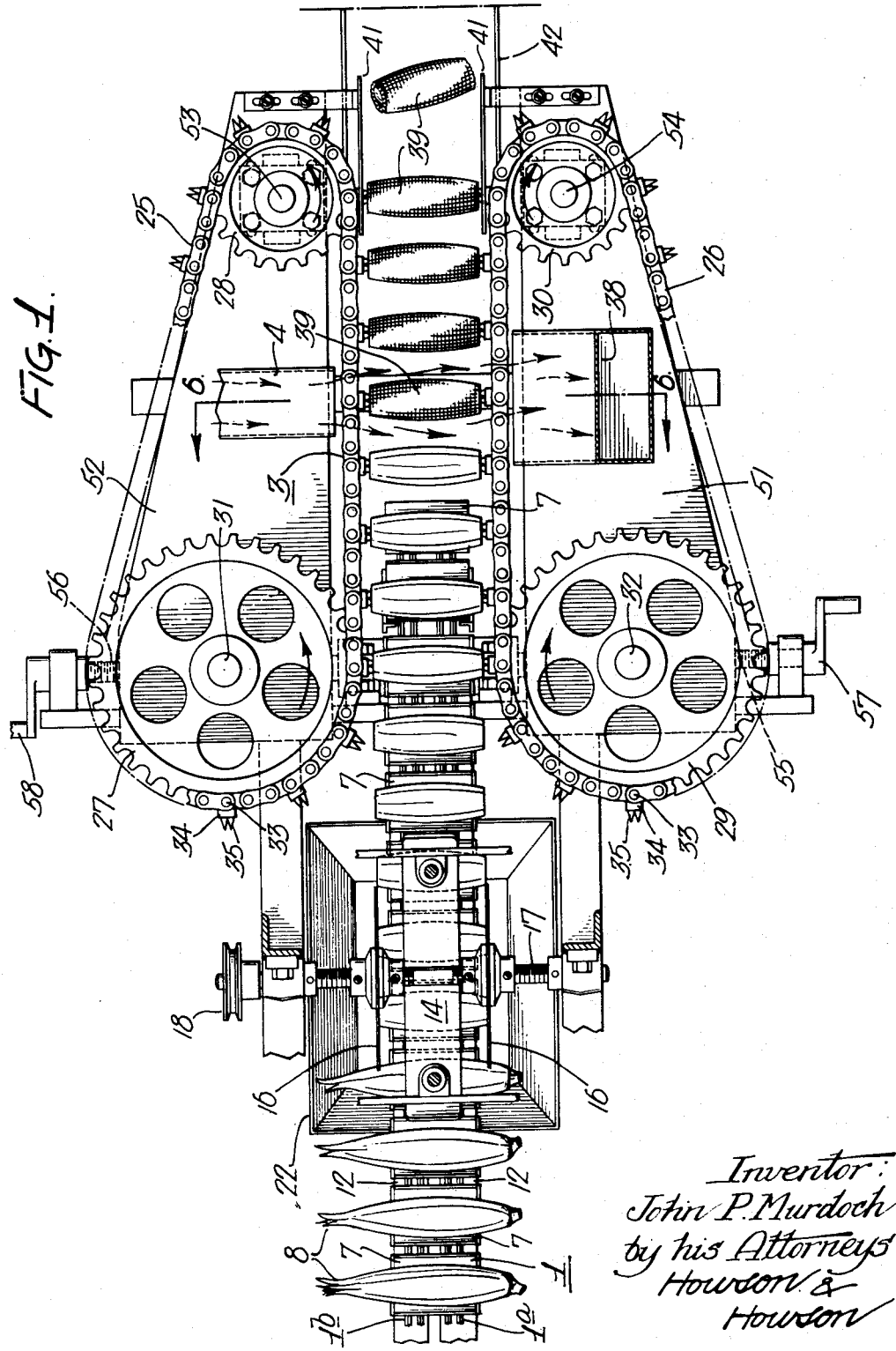

Feb. 17, 1953
J. P. MURDOCH
2,628,621
METHOD AND APPARATUS FOR HUSKING CORN EMPLOYING AN AIR BLAST
Filed Feb. 12, 1948
3 Sheets-Sheet 3
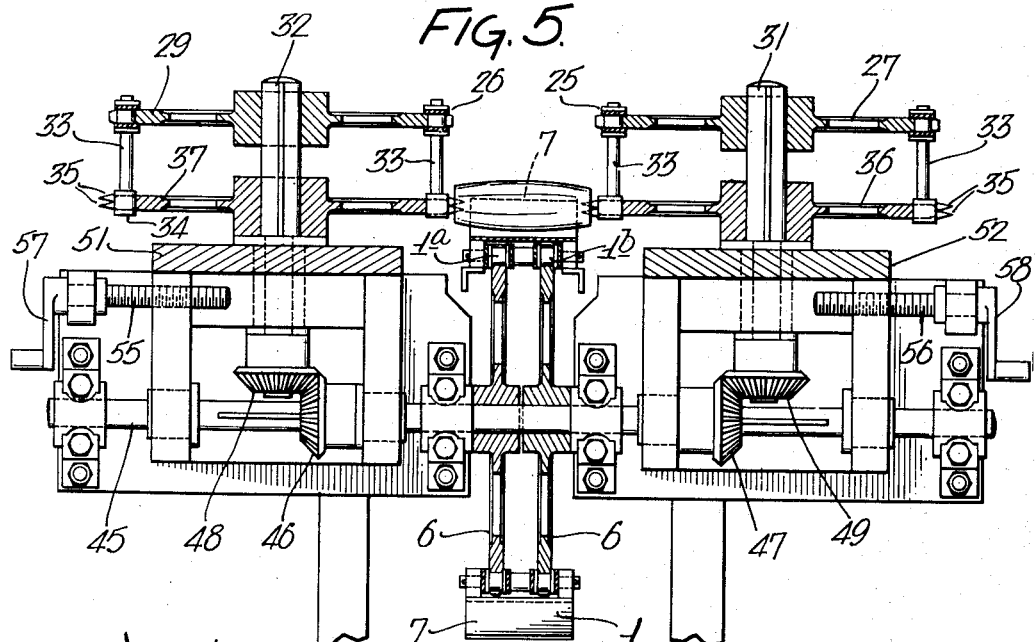
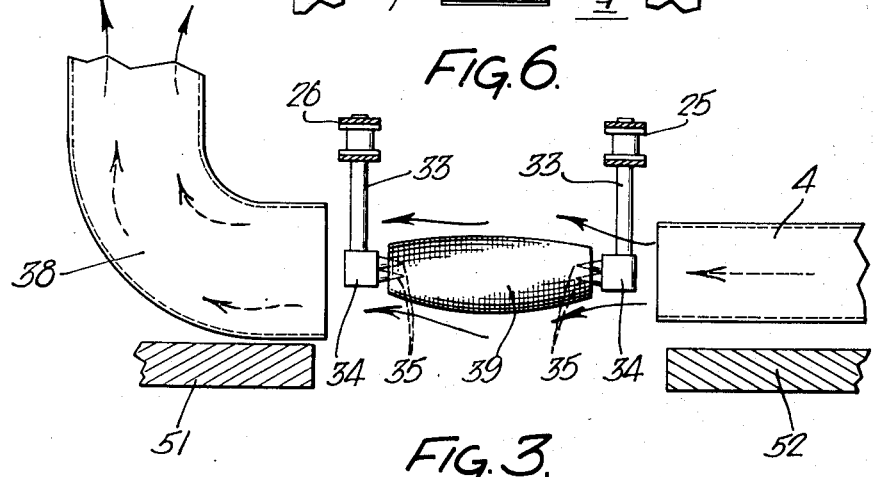
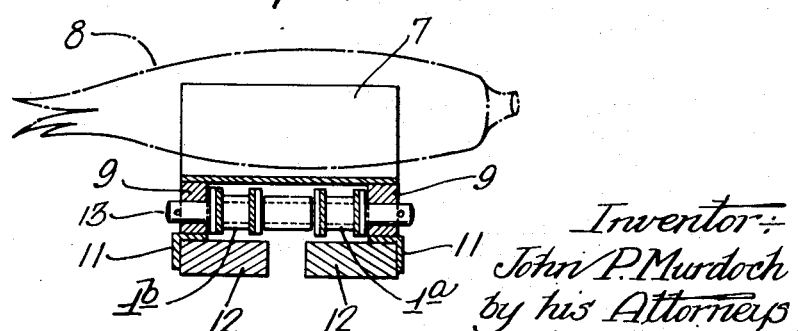
Inventor:
John P. Murdoch
by his Attorneys
Howson &
Howson Patented Feb. 17, 1953

2,628,621

UNITED STATES PATENT OFFICE 2,628,621

METHOD AND APPARATUS FOR HUSKING CORN EMPLOYING AN AIR BLAST

John P. Murdoch, Ardmore, Pa.

Application February 12, 1948, Serial No. 7,868

3 Claims. (Cl. 130—5)

The primary object of this invention is to provide a corn husking machine of generally improved structural and functional characteristics.

More particularly an object of the invention is to provide a corn husking machine of simple and relatively inexpensive construction which utilizes high velocity air to effect a highly efficient separation of the husks from the corn ears.

Another object of the invention is to provide a machine of this character which may be readily adjusted for effective operation upon ears of various lengths.

The invention resides further in certain structural and mechanical details hereinafter described and illustrated in the attached drawings, wherein:

Fig. 1 is a fragmentary top plan view of a machine made in accordance with the invention;

Fig. 2 is a side elevational view of the machine shown in Fig. 1;

Fig. 3 is a sectional view on the line 3—3, Fig. 2;

Fig. 4 is a fragmentary view in perspective of one of the elements of mechanism;

Fig. 5 is a sectional view on the line 5—5, Fig. 1; and

Fig. 6 is a transverse section on the line 6—6, Fig. 1.

With reference to the drawings:

The machine comprises essentially a conveyor 1 adapted to conduct the unhusked ears of corn to a rotary cutting or trimming mechanism designated generally by the reference numeral 2 for removal of both the tip and butt ends of the unhusked ears; and a second conveyor designated generally by the reference numeral 3 which picks up the trimmed ear from the conveyor 1 and presents it to a high velocity air jet, emanating in the present instance from a suitable duct 4, in a position relative to the direction of flow of said jet calculated to render the air effective to strip off the husks and the residual corn silk adhering to the ear.

The conveyor 1 may be of the chain type, as indicated, comprising parallel chain elements 1<sup>a</sup> and 1<sup>b</sup> operating on two sets of sprockets 5, 5 and 6, 6 respectively. This conveyor also comprises a longitudinal closely set series of open ended buckets 7, said buckets having inclined sides and being adapted for reception of the unhusked ears of corn, indicated by the reference numeral 8. The individual buckets 7 are supported at each end by a block 9 to the bottom of each of which is secured an angle member or tread 11, and in the upper flight of the conveyor as indicated in Fig. 2 these treads 11 seat slidably against rails 12, 12 which thereby function to hold the buckets 7 in stable upright position during the aforesaid trimming operation. With reference to Fig. 3 it will be noted that in the present instance the conveyor chains are connected by transverse pins 13 which extend outwardly through apertures in the blocks 9, these pins 13 thereby establishing a pivotal connection between the bucket assemblies and the chain.

The unhusked ears may be placed in the buckets 7 by hand or by any other suitable means. As the ears 8 carried on the conveyor 1 approach the trimming device 2 they pass under and are engaged by a shoe 14 which, through the medium of springs 15, exerts light pressure on the tops of the ears to hold the ears firmly in position during the trimming operation. The trimming device comprises, in the present instance, a pair of rotary cutters or saw blades 16 which are mounted in spaced relation and at opposite sides respectively of the conveyor 1 upon a shaft 17, said shaft being rotated at a suitable speed through the medium of pulleys 18 connected by way of a belt 19 to a motor 20 mounted, for example, upon a suitable support above the shaft 17. The cutters 16 are individually adjustable axially of the shaft 17 so that they may be secured to the shaft in positions to act upon the tip and butt portions of the unhusked ears as the latter are carried past the cutters on the conveyor 1. This adjustability of the blades makes possible the positioning of the blades in accordance with the length of the ears so as to trim the exact amount from the ends of the ears required to condition the ears for the husking operation with a minimum loss of useful corn. It will be noted that the bucket-supporting rails 12, 12 extend continuously over that portion of the upper run of the conveyor which underlies the cutting unit 2, including the pressure element 14, previously described, and also over that portion of the upper run of the conveyor 1 which is overlapped by the proximate end of the conveyor 3. The rails terminate at points directly above the shaft 45 to permit the buckets 7 to turn freely on their pivots as they fall away around the sprockets 6, 6. It is to be noted also that immediately below the shaft 17 is a hopper 22 which receives the severed ends of the unhusked ears and directs them to a proper point of discharge.

With particular reference to Fig. 1, the conveyor 3 comprises two endless chain elements 25 and 26 respectively, these elements operating in horizontal planes and in spaced parallel relation.

The chain 25 is supported on horizontally disposed sprockets 27 and 28 respectively; and the chain element 26 is similarly supported on corresponding sprockets 29 and 30. The sprockets 27 and 29 are supported on vertically disposed shafts 31 and 32 respectively which are arranged at opposite sides of the sprockets 6, 6 which support the parallel chain elements of the conveyor 1 so that the inner runs of the chains 25 and 26 lie in part somewhat above and at opposite sides of those portions of the chains of the conveyor 1 which are passing on to the sprockets 6, 6. Depending from each of the chains 25 and 26 is a series of arms 33 at the lower end of each of which is a block 34 having a cluster of spike-like projections 35 at one face thereof. The arms 33 are secured to the chains 25 and 26, as shown in Fig. 4, wherein it will be noted that they are welded to the links so as to prevent them from turning on their axes with respect to the chains.

The arms 33 terminate at their lower ends at a level corresponding approximately to the longitudinal center line of the unhusked ears 8 supported in the buckets 7 of the conveyor 1 and the spikes 35 are arranged so that as the chains 25 and 26 move in the direction indicated by the arrows in Figs. 1 and 2 and said spikes are brought into engagement with the severed ends of the ears 8 as well shown in Fig. 1. Also, the chains 25 and 26 are spaced with respect to the rotary cutters 16 so that the spikes 35 will enter the ends of the cob portion of the ear whereby, in effect, the ears will be impaled upon the spikes and thereby suspended from and between the proximate and parallel runs of the chains 25 and 26. The use of clusters of spikes as shown insures proper impalement of the ears by compensating for the slight unavoidable variations in the positions of the ears in the buckets 7.

In order to insure a proper penetration of the cob by the spikes 35 a pair of backing wheels 36 and 37 are secured to the shafts 31 and 32 respectively below the sprockets 27 and 29 and at or near the lower ends of the arms 33, said wheels providing a rigid support or backing for the lower ends of the said arms 33 in that portion of the path of travel of said arms wherein the spikes 35 are contacting and penetrating the ends of the ear 8.

In the aforesaid manner the unhusked ears are transferred from the conveyor 1 to the conveyor 3 it being noted by reference to Fig. 2 that immediately following the penetration of the ears by the spikes 35 of the depending arms 33, the conveyor 1 with the ear-supporting buckets 7, drops away around the sprockets 6, 6 leaving the ears supported between the conveyor chains 25 and 26 as described. The ears are now conducted on the conveyor 3 to a point opposite the end of the duct 4 wherein the ear is in longitudinal alignment with the said duct. At the opposite side of the conveyor 3 and also in alignment with the duct 4 is one end of a substantially larger duct 38. High velocity air from a suitable source (not shown), discharged from the duct 4 and acting upon the severed ends of the corn husks at the end of the ear, immediately strips the husks and the remnants of the corn silk from the ear, the said husks and silk discharging into the duct 38 which, if desired, may be connected with a suitable evacuator (also not shown), the stripped material being thereby conducted away from the machine to a suitable receptacle or point of discharge. The stripped ears designated by the reference numeral 39 are now advanced on the conveyor 3 to a point between the sprockets 28 and 30 where they pass between the ends of a pair of stripper blades 41, 41 which act to separate the ear from the spikes 35 to permit them to pass by gravity into the upper end of a discharge chute 42.

It will be noted that in the aforedescribed mechanism, the spacing of the series of arms 33 of the conveyor 3 and of the associated spikes 35 longitudinally of the conveyor 3, corresponds exactly with the spacing of the buckets 7 of the conveyor 1 and that the two conveyors are synchronized in their operations so that the spikes 35 will be brought into accurate alignment with the vertical center planes of the buckets 7 as the two conveyors progress in the manner described above. Similarly, the movement of the chains 25 and 26 of the conveyor 3 are synchronized so that the spikes 35 of the two chains remain constantly in accurate alignment. To these ends, and as illustrated in Fig. 2, the conveyor 1 is actuated through a suitable drive chain 43 from a motor 44. The sprockets 6, 6, of the conveyor 1 are mounted on a shaft 45 (see Fig. 5) which carries on the projecting ends thereof a pair of beveled gears 46 and 47, said gears being keyed or splined to the shaft so as to be capable of axial adjustment on the latter. These gears mesh with beveled gears 48 and 49 at the lower ends of the shafts 31 and 32, which as previously described support the sprockets 27 and 29 of the conveyor 3. These shafts 31 and 32 are journaled in frames 51 and 52 which also support the shafts 53 and 54 of the sprockets 28 and 30 of the conveyor 3 and are mounted in the fixed framework of the machine as indicated in Fig. 5 for adjustment laterally with respect to the longitudinal line of the conveyors 1 and 3. Adjusting screws 55 and 56 actuated by suitable handles 57 and 58 are provided for adjusting the frames 51 and 52 laterally to thereby vary the distance between the confronting runs of the conveyor chains 25 and 26 so as to bring the spacing of these chains into conformity with the spacing of the rotary cutters 5, 5 which are relatively adjustable on the shaft 17 as described above.

From the foregoing description it will be noted that the conveyor 1 constitutes in effect a part of the transmission for operating the conveyor 3 from the driving motor 44. Further, the sprockets 27 and 29 of the conveyor 3 are driven in synchronism from the same shaft 45.

It will be apparent that the machine as described above is capable of considerable modification in detail without departure from the principle of the invention as defined in the following claims.

I claim:

1. Corn husking mechanism comprising in combination automatic cutting elements for transversely severing the husk and the cob at the respective tip and butt ends of the latter, an air jet, and automatically traversed elements engageable with the end surfaces of the cob exposed by said severing operation and exclusive of the husk for carrying the cob into and in longitudinal alignment with said jet.

2. Corn husking mechanism comprising in combination a conveyor unit having means for supporting unhusked ears at their midsections in positions transverse to the direction of travel, cutting elements arranged to sever the ears near the extremities thereof so as to expose the cob, a second conveyor unit having transversely spaced elements converging towards opposite sides respectively of the unit first named, ear engaging devices on said elements forming confronting pairs arranged to engage the opposite exposed ends of the cobs of the ears advanced by the first named unit and to pick up the ears from said unit, rotary elements for guiding the said spaced elements of the second unit in their coverging paths, mechanism for synchronously operating said conveyor units, and a stripping device operatively associated with the second named conveyor unit including a nozzle arranged to project a velocity air jet against an end of the ear and longitudinally of the latter.

3. The method of removing husks and silk from ears of green corn which comprises: supporting the ears between their ends, moving the ears while so supported through a cut-off station and simultaneously cutting off the two opposite ends of the ears therein, thereafter removing the support from between the ends of the ears of corn and supporting them instead by their debutted ends, moving the ears while supported by their ends to a husking station, and blowing air under pressure axially against opposite ends of the ears while supported by their ends for stripping the husks and silk therefrom.

JOHN P. MURDOCH.

REFERENCES CITED

The following references are of record in the file of this patent:

UNITED STATES PATENTS

| Number | Name | Date |
|---|---|---|
| 722,448 | Fitzpatrick | Mar. 10, 1903 |
| 796,481 | Weiss | Aug. 8, 1905 |
| 800,543 | Briggs et al. | Sept. 26, 1905 |
| 820,329 | Allen | May 8, 1906 |
| 837,445 | Wolfe | Dec. 4, 1906 |
| 864,238 | Fitzpatrick | Aug. 27, 1907 |
| 893,126 | Baetz | July 14, 1908 |
| 1,028,616 | Sells | June 4, 1912 |
| 1,121,937 | Morral | Dec. 22, 1914 |
| 1,166,647 | Wolfe | Jan. 4, 1916 |
| 1,190,598 | Seierup | July 11, 1916 |
| 1,567,736 | Howson | Dec. 29, 1925 |
| 2,037,661 | Knight | Apr. 14, 1936 |
| 2,100,137 | Groves | Nov. 23, 1937 |
| 2,202,540 | Stler | May 28, 1940 |
| 2,445,881 | Hemmeter | July 27, 1948 |